INVENTOR.
David L. Fayram
BY
Albert F. Duke
ATTORNEY

United States Patent Office 3,343,168
Patented Sept. 19, 1967

3,343,168
RADAR SYSTEM AND METHOD OF
TESTING SAME
David L. Fayram, Greendale, Wis., assignor to General
Motors Corporation, Detroit, Mich., a corporation of
Delaware
Filed Dec. 29, 1965, Ser. No. 517,307
7 Claims. (Cl. 343—17.7)

ABSTRACT OF THE DISCLOSURE

This invention relates to a method of aligning a radar utilizing an external test generator for transmitting a test signal to the radar simulating a target return. The radar magnatron is disconnected during alignment and the test signal is heterodyned with the radar local oscillator signal. The difference signal thus obtained feeds the AFC loop of the radar to control the frequency of the local oscillator. By referencing to the test signal the radar automatically operates within a predetermined bandpass during alignment obviating the need for a test generator operator.

---

This invention relates to a radar system which may be placed in a test mode of operation for aligning the radar in response to externally generated radar test signals and more particularly to a method of testing a radar wherein the radar receiver local oscillator is controlled in accordance with the intermediate frequency obtained from mixing the local oscillator signal with the test generator signal.

Radar systems require alignment at regular intervals and whenever a component of the system such as the computer, antenna, receiver-transmitter, or modulator is replaced or when these components malfunction. Present alignment procedures are excessively time consuming and often the results are inaccurate if not completely erroneous. The present invention obviates the disadvantages of the prior art and permits alignment in a relatively short period of time without the necessity of operating certain critical components of the radar during the alignment procedure.

Radar operates on the principle of transmitting RF pulses toward a target, receiving the return which is delayed in time with respect to the transmitted pulses and computing various parameters such as range and target elevation based on the characteristics of the returned pulses. In normal operation a magnetron located in the transmitter-receiver generates high energy RF pulses, a sample of which is mixed with a sample from a klystron local oscillator and fed to an AFC loop in the receiver-transmitter which maintains the frequency of the local oscillator at, for example, 30 megacycles below that of the magnetron. The purpose of the local oscillator is to provide a reference which when mixed with a return pulse will generate an IF signal upon which the rest of the radar system operates. Ideally, this IF is 30 megacycles but the AFC loop of the radar system allows a tolerance of ±2 megacycles. To generate the necessary 30 megacycles IF, the output of the local oscillator is mixed with the return pulse to generate sum and difference IF signals. The difference signal then becomes the 30 megacycle IF since the return signal has the same frequency as the pulses transmitted by the magnetron and the local oscillator is maintained at 30 megacycles below the magnetron. Since the transmission and reception of pulses forms the basis for radar operation, it is apparent that alignment of a radar system requires that these pulses be simulated in a very precise and very stable manner with respect to frequency, amplitude and phase. In other words, if the pulse signals used for alignment are not precisely similar to those generated by the magnetron during actual operation, an inaccurate and all too often erroneous alignment results. Accordingly, it is generation of a correct test signal that has been the object of widespread concern.

In radar systems which include terrain avoidance capabilities testing equipment which made use of an anechonic chamber for producing an echo signal were inadequate. Accordingly, separate test generators were employed which fired a return pulse in a variable delay relationship to the magnetron pulse. The characteristics of the pulses from the test generator were manually and continually adjusted by its operator in accordance with information from an operator at the radar who would guide the test generator operator in adjusting the frequency of the return pulses to be within the 30±5 megacycle bandpass of the system. With this approach it is possible for the test generator frequency to be 30 megacycles above rather than below the magnetron frequency without being detected thereby resulting in large system phasing errors. In addition, this approach did not permit setting the IF precisely at 30 megacycles. All that could be determined was that the IF was in its 30±5 megacycle band. In a terrain avoidance system including sum and difference channels, the phase and gain of one channel has to be aligned with the other and to make such alignments valid for airborne operation, they have to be made at the IF of airborne operation or as in the example illustrated here, at 30 megacycles. If aligned at any other IF, errors are built into airborne operation.

In order to more clearly approach the 30 megacycles IF, it has been proposed to AFC the external test generator using the 30 megacycle IF from the receiver-transmitter to maintain a constant return signal. However, this approach requires two AFC circuits and requires magnetron operation during alignment. In such systems errors are still introduced because neither AFC loop can be peaked precisely at 30 megacycles.

In accordance with the present invention, only one AFC loop is used. This is the AFC loop located in the radar and is consequently the same AFC loop used in airborne operation. Moreover, the IF which is utilized in the AFC loop is obtained by mixing the local oscillator frequency with the signal generated from the test signal rather than from the radar magnetron which permits the magnetron to be disconnected during the alignment operation which thus extends the useful life of the magnetron. By controlling the radar local oscillator with respect to the test signal rather than the magnetron signal, the radar system automatically operates within the 30±5 megacycle bandpass during alignment and therefore the operator of the test generator is eliminated. Further, by knowing the system is constantly within its bandpass, many procedural steps associated with checking bandpass are eliminated while alignment steps can be automated.

A more complete understanding of the present invention may be had from the following detailed description which should be read in conjunction with the drawings in which.

Figure 1:
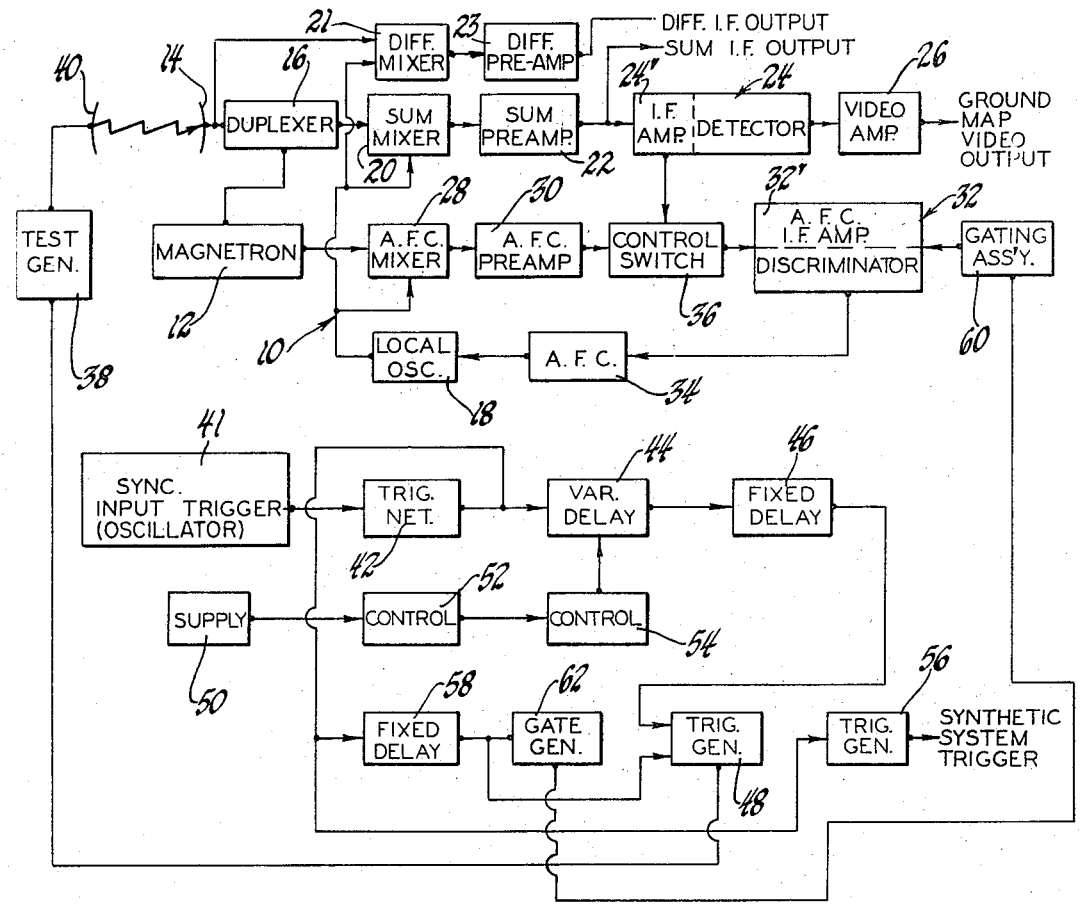
FIGURE 1 is a block diagram of the proposed radar system and an external test generator for use in aligning the system.

Referring now to the drawings and initially to FIGURE 1, a receiver-transmitter for a terrain avoidance radar is generally designated 10. The receiver-transmitter includes a magnetron 12 which in normal operation generates RF pulses which are transmitted toward a target from an antenna 14 through a duplexer 16 in response to pulses from a modulator (not shown). The echo pulses from a target are received at the antenna 14, and fed to sum and difference channels in the receiver transmitter 10. The echo pulses pass through the duplexer 16 and are heterodyned with a signal from a local oscillator 18 in a mixer 20 of the sum channel of the receiver 10. The output of the mixer 20 is fed to a preamplifier 22, an IF amplifier and detector 24, and a video amplifier 26. The echo pulses are also fed in the conventional manner from the antenna 14 to a mixer 21 and a preamplifier 23 of the difference channel. In order to maintain the sum IF output at 30 megacycles, for example, the frequency of the local oscillator 18 is automatically controlled by mixing the magnetron output with the local oscillator output in a mixer 28, the output of which is fed to a preamplifier 30, an AFC IF amplifier and discriminator 32 and an AFC control 34.

In accordance with the present invention, a control switch 36 is provided in the receiver-transmitter and is adapted to selectively connect either the preamplifier 30 or the IF amplifier 24' to the AFC IF amplifier 32', depending upon whether the switch is in the normal position or in a test mode position. Thus, in normal operation, the local oscillator 18 tracks the magnetron 12 where as during alignment, the local oscillator 18 tracks the received test signal.

In order to align the radar, a test generator 38 feeding an antenna 40 is provided for generating RF pulses to the receiver-transmitter antenna 14. Since in the test mode of operation, the local oscillator 18 of the receiver-transmitter 10 is slaved to the test generator signal rather than the magnetron signal, the radar system will automatically operate within the 30±5 megacycle bandpass during alignment and therefore the numerous adjustments of the test generator frequency necessary in the prior art arrangements have been obviated. Moreover, with the magnetron 12 disabled during the alignment operation, the life of the magnetron is greatly extended. Triggering of the test generator 38 and simulation of various target ranges is accomplished by applying a synchronizing input trigger which may be obtained from a crystal controlled oscillator 41 through trigger network 42, variable delay circuitry 44, fixed delay circuitry 46, and a trigger generator 48. Preferably, the fixed delay 46 in combination of the variable delay 44 is sufficient to delay triggering of the test generator at least one computational cycle with respect to the synchronizing input trigger. For example, with a computational cycle of 1236 microseconds, the fixed delay circuitry 46 may provide 1080 microsecond delay while the variable delay circuitry 44 may provide up to 317 microsecond delay. Control of the variable delay circuitry 44 is accomplished by applying an analog D-C voltage obtained by a power supply 50, an uncalibrated delay control potentiometer 52, and a calibrated delay control potentiometer 54. For further particulars with respect to the delay circuitry 44, 46 and the effects thereof on the radar PPI display, reference is made to my copending application, Ser. No. 517,308, filed December 29, 1965.

In operation, the calibrated delay control potentiometer 54 is set at zero nautical miles and the uncalibrated potentiometer 52 is adjusted to provide a variable delay which when added to the fixed delay will provide a simulated echo signal of zero nautical miles on the radar plan position indicator. The calibrated delay control potentiometer 54 may then be varied over a range of, for example, 0–10 nautical miles and the ability of the radar to accurately detect these changes in range may be determined and adjustment in the system may be made to insure accurate displays. By varying the pitch of the antenna 14, various target elevations may be simulated in a known and conventional manner.

As indicated previously, during alignment the magnetron 12 is completely disabled. Accordingly, the output of the trigger network 42 is applied to a trigger generator 56 to synthetically generate a system trigger.

Generally a radar is provided with a sensitivity time control (STC) generator which is adapted to decrease the gain of the sum channel during the return of RF signals from short range targets so as to prevent saturation of the sum channel amplifiers with resulting errors. While sensitivity time control is needed during the alignment procedure for the same reason as in airborne operation, under certain conditions the decrease in the gain of the sum channel might result in an insufficient signal for operating the AFC control 34. Thus, under certain conditions, it might be impossible to utilize a single burst of energy from the test generator 38 for both alignment computation and for controlling the local oscillator 18. Accordingly, the test generator 38 is double pulsed, once during "radar time" which is the first half of the total 1236 microsecond cycle and once during "failure warning time" which corresponds to the second half of the 1236 microsecond computational cycle. Triggering of the external test generator during "radar time" is accomplished through the path including the trigger network 42, variable delay 44, fixed delay 46 and generator 48. Triggering of the test generator 38 in the "failure warning time" is accomplished through a path including the trigger network 42, a fixed delay circuit 58 and the generator 48. Based on the 1236 microsecond computational cycle, the fixed delay 58 may, for example, be 680 microseconds. The output of the fixed delay 58 controls a gating assembly 60 through a gate generator 62 to enable the AFC IF amplifier 32' only for a short interval of time during one computational cycle. During this time, the local oscillator 18 is adjusted to provide the desired 30 megacycle IF. This arrangement insures a constant amplitude signal during automatic frequency control of the local oscillator 18 without modifying the sensitivity time control feature.

Figure 2:
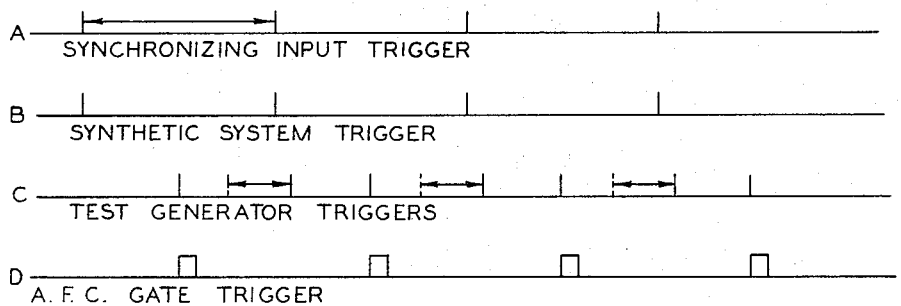
FIGURE 2 shows various waveforms in the system.

Referring now to FIGURE 2, various waveforms associated with the components of FIGURE 1 are shown. Waveform A is the synchronizing input trigger as applied to the trigger network 42 every 1236 microseconds. A synthetic system trigger as shown in waveform B is generated in synchronism therewith. After a delay of 680 microseconds provided by the fixed delay 58, the trigger generator 48 triggers the test generator 38 for generating a test signal to the antenna 14 as indicated by the first pulse in waveform C. At the same time, the gating assembly 60 enables the AFC IF amplifier 32' in response to the operation of the gate generator 62 as shown in waveform D. During the short interval of time that the AFC IF amplifier 32' is enabled, the local oscillator 18 is adjusted to obtain the 30 megacycle intermediate frequency. After the IF amplifier 32 is disabled, the test generator 38 is triggered a second time as provided by the variable delay 44 and the fixed delay 46 to simulate a target distance depending upon the adjustment of the calibrated delay control potentiometer 54. This is represented in waveform C as occurring somewhere between the dotted and full line pulse positions separated by the arrow, the location depending on the adjustment of the variable delay 44. Since several radar systems may be operated or aligned simultaneously, the gating of the AFC IF amplifier prevents signals from one system being erroneously received and operated on by another.

While the invention has been described with regard to the preferred embodiment thereof, variations and modifications will now occur to those skilled in the art. For a definition of the invention, reference is made to the appended claims.

I claim:

1. A method of testing a radar comprising the steps of transmitting a simulated target return signal to said radar, obtaining an intermediate frequency signal by mixing said return signal with a signal from the radar receiver local oscillator, automatically controlling the frequency of said local oscillator as a function of said intermediate frequency, and varying the time of transmission of said simulated target return signal with respect to a reference trigger signal in said radar.

2. A method of testing a radar comprising the steps of transmitting a simulated target return signal to said radar,
obtaining an intermediate frequency signal by mixing said return signal in the sum channel of the radar receiver with a signal from the radar receiver local oscillator,
feeding the intermediate frequency so obtained to automatic frequency control means for automatically controlling the frequency of said local oscillator as a function of said intermediate frequency,
gating said automatic frequency control means for an interval of time during which a return signal is being transmitted and simulating changes in target range by varying the time of transmission of said return signal with respect to a reference trigger signal at the radar receiver.

3. A method of testing a radar comprising the steps of transmitting first and second simulated target return signals to said radar,
obtaining an intermediate frequency signal by mixing said return signals with a signal from the radar receiver local oscillator,
feeding said intermediate frequency signal to automatic frequency control means for automatically controlling the frequency of said local oscillator as a function of said intermediate frequency,
enabling said automatic frequency control means for an interval of time during which said first return signal is being transmitted,
simulating changes in target range by varying the time transmission of said second return signal with respect to a reference trigger signal at said radar.

4. A radar including receiver-transmitter means comprising a magnetron,
a local oscillator,
first mixing means for mixing a received signal with a signal from said local oscillator,
second mixing means for mixing signals from said magnetron and said local oscillator,
automatic frequency control means for controlling the frequency of said local oscillator,
switch means having a normal position connecting the output of said second mixing means to said automatic frequency control means and a test position connecting the output of said first mixing means to said automatic frequency control means.

5. In combination radar test generator means for transmitting a test signal,
pulse generating means providing a reference input signal,
trigger generating means for triggering said test generator means,
adjustable time delay means connected between said pulse generating means and said trigger generating means for delaying the triggering of said test generator means with respect to said reference input signal,
a radar including a receiver having a local oscillator,
a mixer in said receiver responsive to said test signal and a signal from said local oscillator for developing an intermediate frequency signal,
amplifier means for amplifying said intermediate frequency signal and automatic frequency control means responsive to said intermediate frequency signal for maintaining the frequency of said local oscillator at a predetermined frequency relative to the frequency of said test signal.

6. The combination defined in claim 5 wherein said receiver includes sum and difference channels and said mixer is in said sum channel.

7. The combination defined in claim 6 wherein said time delay means includes fixed and variable time delay circuitry and means for controlling said variable time delay circuitry and wherein said combination further includes additional fixed time delay circuitry connected in parallel with said time delay means whereby said test generator means is triggered twice during the period of said reference input signal and gating means for gating said automatic frequency control means in synchronism with the triggering of said test generator means associated with said additional time delay circuitry.

No references cited.

RODNEY D. BENNETT, *Primary Examiner.*

T. H. TUBBESING, *Assistant Examiner.*